UNITED STATES PATENT OFFICE.

DAVID S. FRENCH, OF DELPHI, INDIANA.

IMPROVEMENT IN HOG-CHOLERA COMPOUNDS.

Specification forming part of Letters Patent No. 209,879, dated November 12, 1878; application filed October 7, 1878.

*To all whom it may concern:*

Be it known that I, DAVID S. FRENCH, of Delphi, in the county of Carroll and State of Indiana, have invented certain new and useful Improvements in Medicines for Hog-Cholera; and I do hereby declare that the following is a full, clear, and exact description thereof.

The object I have in view is a compound for the treatment of hog-cholera, in the preparation of which I use the following ingredients, and substantially in the following proportions, viz:

Black antimony, one-half (½) pound; Spanish brown, one-half (½) pound; rosin, two (2) pounds; podophyllin, one (1) ounce; sanguinaria, five (5) ounces; leptandrin, one (1) ounce; sulphate of iron, one-half (½) pound; saltpeter, one-half (½) pound; alum, one-half (½) pound; sulphur, one (1) pound; charcoal, eight (8) pounds; salt, four (4) pounds; poke-root, (which may be either dry or green, but preferably green,) eight (8) pounds; cayenne-pepper, one (1) pound; soft soap, one (1) gallon.

Mode of preparation: Boil the poke-root in water until the strength is out of it, and after straining it add to the liquor thus obtained about ten gallons of water. The other ingredients are now pulverized and put therein. After being well stirred, the compound is ready for use.

Directions for use: Give a pint of the mixture to a hog three times a day. Give it in slop, or, if the hog is too far gone, give it in fresh milk. Separate the sick hogs from the well. Place them in dry and comfortable pens or lots, not to exceed ten or twelve to a lot. To prevent disease, give the preparation once a day during its prevalence.

I am aware of the Patent No. 38,169, April 14, 1863, issued to F. La Rew, in which appear many of the ingredients of my composition, but with such I have combined certain other ingredients stated, which modify and alter the action of the compound claimed.

Having thus fully set forth my invention, what I claim, and desire to secure by Letters Patent, is—

A composition consisting of the following ingredients, to wit: Black antimony, Spanish brown, rosin, podophyllin, sanguinaria, leptandrin, sulphate of iron, salpeter, alum, sulphur, charcoal, salt, poke-root, cayenne-pepper, and soft soap, in about the proportions and for the purposes set forth.

In testimony that I claim the foregoing as my own I affix my signature in presence of two witnesses.

DAVID S. FRENCH.

Witnesses:
CHRISTIAN GROS,
ABE ROSENTHAL.